United States Patent
Tazaki et al.

(10) Patent No.: US 6,359,889 B1
(45) Date of Patent: Mar. 19, 2002

(54) CELL SWITCHING DEVICE FOR CONTROLLING A FIXED RATE CONNECTION

(75) Inventors: Yuji Tazaki; Toshiyuki Kamo; Masatoshi Kumagai, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/257,151

(22) Filed: Feb. 24, 1999

(30) Foreign Application Priority Data

Jul. 31, 1998 (JP) .......................... 10-218016

(51) Int. Cl.[7] .............................. H04L 12/56
(52) U.S. Cl. .................. 370/395; 370/409; 370/419; 370/468
(58) Field of Search ................ 370/230, 232, 370/233, 235, 236, 395, 449, 455, 462, 463, 468, 469, 477, 496, 400, 409, 465, 379, 419, 229, 252, 396, 399, 420

(56) References Cited

U.S. PATENT DOCUMENTS

| | | | | |
|---|---|---|---|---|
| 5,463,620 A | * | 10/1995 | Sriram ........................ | 370/412 |
| 5,504,744 A | * | 4/1996 | Adams et al. ............... | 370/232 |
| 5,570,355 A | * | 10/1996 | Dail et al. ................... | 370/352 |
| 5,742,594 A | * | 4/1998 | Natarajan .................... | 370/336 |
| 5,784,358 A | * | 7/1998 | Smith et al. ................. | 370/230 |
| 5,850,399 A | * | 12/1998 | Ganmukhi et al. .......... | 370/412 |
| 5,878,029 A | * | 3/1999 | Hasegawa et al. ........... | 370/236 |
| 5,933,607 A | * | 8/1999 | Tate et al. ................... | 370/395 |
| 5,953,338 A | * | 9/1999 | Ma et al. ..................... | 370/395 |
| 5,982,748 A | * | 11/1999 | Yin et al. .................... | 370/232 |
| 6,097,722 A | * | 8/2000 | Graham et al. ............. | 370/395 |

FOREIGN PATENT DOCUMENTS

| | | |
|---|---|---|
| JP | 3-235448 | 10/1991 |
| JP | 8-055096 | 2/1996 |
| JP | 8-288953 | 11/1996 |
| JP | 9-036880 | 2/1997 |
| JP | 9-107360 | 4/1997 |
| JP | 9-162875 | 6/1997 |
| JP | 10-013416 | 1/1998 |

* cited by examiner

Primary Examiner—Seema S. Rao
(74) Attorney, Agent, or Firm—Rosenman & Colin LLP

(57) ABSTRACT

A bandwidth table holds a CBR bandwidth about a bandwidth that a CBR connection can occupy. A CAC unit controls whether or not to permit the establishment of a CBR connection while performing an overbooking bandwidth control for permitting a currently used bandwidth to exceed the CBR bandwidth, based on the CBR bandwidth set in the bandwidth table and the use state of the current CBR connection, when establishing the CBR connection.

13 Claims, 15 Drawing Sheets

| n | 8 | 7 | 6 | 5 | 4 | 3 | 2 | 1 |
|---|---|---|---|---|---|---|---|---|
| | | | | USE STATE/ BANDWIDTH TABLE | | | | |

F I G. 1 3

CELL SWITCHING DEVICE FOR CONTROLLING A FIXED RATE CONNECTION

BACKGROUND OF THE INVENTION

1. Field of the Invention

The present invention relates to a digital switching system, and more particularly to a technique for controlling a fixed rate connection such as a CBR (Constant Bit Rate) connection, etc. within a cell switching system such as an ATM (Asynchronous Transfer Mode) system, etc.

2. Description of the Related Art

A data transfer based on an ATM method has been made practical as a way of realizing a B-ISDN (Broadband-Integrated Service Digital Network). The B-ISDN handles data used by computers and services such as telephony speech signals, facsimile signals, VOD (Video On Demand) signals, etc. within a single network.

To support these various services, a CBR service for securing a fixed bandwidth and services such as rt-VBR, nrt-VBR, ABR, UBR, etc. whose bandwidths in use (simply referred to as bandwidths hereinafter) change depending on the use state of the network, are provided. These services are provided in order to be adaptable to different upper applications depending on use purposes.

Among the above described services, a CBR service is intended to handle an upper application service such as telephony speech, VOD, etc., which requires a strict delay condition.

An ATM exchange occupies a physical bandwidth corresponding to a requested bandwidth when establishing a CBR service connection.

FIG. 1 shows the configuration of a conventional ATM switching system.

When a subscriber telephone 2, terminal 3, or television (TV) 4, which is to receive a VOD (Video On Demand) service, originates a call, a CAC (Connection Admission Control) unit 9 within a node 1, which is an ATM exchange that receives the signal via a subscriber line 5, 6, or 7, checks whether or not there is an empty band of a CBR connection to a destination by referencing a bandwidth table 10. If there is an empty band, the CAC unit 9 establishes a connection.

For the services (such as rt-VBR, nrt-VBR, ABR, and UBR) whose bandwidths change depending on cell traffic, the node 1 controls their cell traffic and performs statistical multiplexing control. Therefore, a line efficiency is high and subscribers are not troubled so much.

However, because the CBR service occupies a bandwidth based on a PCR (Peak Cell Rate), the subscriber TV 4 which receives a CBR service occupies a particular bandwidth resource possessed by the node 1. Accordingly, the subscriber telephone 2 or terminal 3, which handles another application, can perform statistical multiplexing only with the remaining bandwidth resource except for the bandwidth occupied by the CBR service.

Conventionally, the CBR service could not accept a subscriber who requests a physical bandwidth exceeding a total bandwidth allocated to the CBR service.

With the above described conventional technique, no special restriction is imposed when an ATM exchange establishes a CBR connection. Namely, if the physical bandwidth used by the CBR connection permits, any large number of CBR connections can be set up. Therefore, the CBR service which handles an application service with a strict delay condition such as a VOD service, a speech service, etc. occupies the bandwidth of a switch within an ATM exchange, which leads to the connection disability of a subscriber using a different application service (such as an Internet service).

As a result, the number of CBR service subscribers must be restricted so as to overcome the above described problems. In this case, however, cost per subscriber cannot be reduced.

SUMMARY OF THE INVENTION

The present invention was developed in the above described background, and aims at effectively using the bandwidth of a switch within an exchange, and at preventing each service subscriber from being troubled, when a cell exchange such as an ATM exchange, etc. establishes a fixed rate connection.

The present invention assumes an ATM switching device (an ATM exchange) for switching fixed-length cells (ATM cells), and for controlling a fixed rate connection (CBR connection).

A fixed rate bandwidth setting unit (bandwidth table 20) sets fixed rate bandwidth (CBR bandwidth) information being the information about the bandwidth that a fixed rate connection can occupy.

A use state setting unit (use state 22) sets fixed rate used bandwidth information (bandwidth used by a CBR service) being the information about the bandwidth that a fixed rate connection currently uses.

A call controlling unit (CAC unit 19) controls whether or not to permit the establishment of a fixed rate connection while performing an overbooking bandwidth control which permits the bandwidth indicated by fixed rate used bandwidth information to exceed the bandwidth indicated by fixed rate bandwidth information, based on the fixed rate bandwidth information set in the fixed rate bandwidth setting unit and on the fixed rate used bandwidth information set in the use state setting unit, when establishing the fixed rate connection, and updates the fixed rate used bandwidth information set in the use state setting unit.

The above described configuration according to the present invention can be implemented so that the fixed rate bandwidth setting unit and the use state setting unit are arranged for a corresponding capability part such as a line device (line unit 30) for switching or concentration-multiplexing cells, a shelf device (shelf unit 31) for concentrating the line device, a switching device (switching unit 32) for switching cells input/output to/from the shelf device, etc., and the call controlling unit controls the overbooking bandwidth control for the corresponding capability part while referencing the fixed rate bandwidth setting unit and the use state setting unit, which are arranged for the corresponding capability part.

The configuration according to the present invention described so far can be implemented so that the call controlling unit attempts to broaden the bandwidth that a fixed rate connection can occupy, if the bandwidth that the fixed rate connection currently uses covers the bandwidth that the fixed rate connection can occupy, when performing the overbooking bandwidth control; changes the fixed rate bandwidth information set in the fixed rate bandwidth setting unit according to the broadened bandwidth; and controls whether or not to permit the establishment of the fixed rate connection.

In this case, the call controlling unit can be configured to attempt to broaden the bandwidth that the fixed rate connection can occupy based on the bandwidth information of the fixed rate connection, which is notified from an adjacent cell switching device, if the bandwidth that the fixed rate connection currently uses covers the bandwidth that the fixed rate connection can occupy, when performing the overbooking bandwidth control; and notifies the adjacent cell switching device of the new bandwidth information about the fixed rate connection according to the control result. In this case, the communication of the above described bandwidth information is made between the cell switching devices, for example, by using a resource management cell or a signaling message.

Or, the call controlling unit can be configured to attempt to broaden the bandwidth that a fixed rate connection can occupy based on the state of the bandwidth of the fixed rate connection controlled in other capability units within the cell switching device, if the bandwidth that the fixed rate connection currently uses covers the bandwidth that the fixed rate connection can occupy, when performing the overbooking bandwidth control.

The configuration according to the present invention described so far can be implemented so that the fixed rate bandwidth information set in the fixed rate bandwidth setting unit is changed according to a use rate change of the fixed rate connection, which depends on a time zone, or an increase/decrease in a requested number of fixed rate connections.

The configuration according to the present invention described so far can be implemented so that each of cell switching devices for exchanging a signaling message regarding a fixed rate connection adds the information for specifying whether or not the fixed rate connection is overbooking-bandwidth-controlled by the call controlling unit, to the signaling message regarding the fixed rate connection, which is exchanged by each of the cell switching devices.

The configuration according to the present invention described so far can be implemented so that the call controlling unit performs the overbooking bandwidth control only for the connection from a server to a client when a fixed rate connection of a server-client type is established.

Another configuration of the present invention assumes a method for controlling a fixed rate connection (CBR connection) which implements a communication using fixed-length cells (ATM cells).

First of all, a virtual path connection is established between a cell switching device and a user home device when a fixed rate connection is established.

When the fixed rate connection is established for the terminal accommodated by the user home device, whether or not to permit the establishment of the fixed rate connection is controlled while performing the overbooking bandwidth control which permits the bandwidth that the fixed rate connection currently uses to exceed the bandwidth of the virtual path connection.

According to the present invention, a multiplexing effect can be obtained for a CBR connection, etc. without troubling any other users, by performing an overbooking bandwidth control for a fixed rate connection such as a CBR connection, etc. As a result, the use efficiency of a line can be improved for the CBR connection, etc.

Additionally, according to the present invention, traffic control with more flexibility and a higher accuracy can be performed for a CBR connection, etc. by performing an overbooking bandwidth control for a fixed rate connection such as a CBR connection, etc. for the corresponding capability part within a cell switching device.

At this time, the capability units in which the overbooking bandwidth control is performed are restricted, so that an efficient traffic control can be performed.

Furthermore, according to the present invention, a line use efficiency can be improved within an entire network by obtaining the bandwidth information about an adjacent capability unit or an adjacent node CBR connection, etc., and by attempting to broaden an available bandwidth of the CBR connection, etc. based on the obtained information.

In this case, the bandwidth information of the fixed rate connection such as a CBR connection, etc. can be efficiently exchanged between adjacent cell switching devices by using a resource management cell or a signaling message.

Still further, according to the present invention, a line use efficiency can be further improved by changing an available bandwidth of a fixed rate connection such as a CBR connection, etc. according to a time zone.

Still further, according to the present invention, a priority for determining whether or not to secure a dedicated bandwidth can be assigned to a fixed rate connection by adding to a signaling message the information for specifying the presence/absence of an overbooking bandwidth control, when the signaling message regarding the fixed rate connection is exchanged between cell switching devices.

Still further, according to the present invention, a line use efficiency on a server side can be improved without degrading the communication quality of a service request issued from a client side to the server side by performing an overbooking bandwidth control only for the connection from the server side to the client side when a fixed rate connection of a server-client type is established.

Still further, according to the present invention, a limited line resource of a fixed rate connection connected by a user can be effectively shared among terminals by performing an overbooking bandwidth control for the fixed rate connection within a user home device.

BRIEF DESCRIPTION OF THE DRAWINGS

One skilled in the art can easily understand additional features and objects of the present invention from the description of the preferred embodiments and some of the attached drawings. In the drawings:

FIG. 13 shows the structure of the CBR bandwidth information added to a signaling message;

DESCRIPTION OF THE PREFERRED EMBODIMENTS

Provided below is the explanation about the details of the preferred embodiments according to the present invention.

The present invention enables multiple connections (overbooking) of a CBR connection within a controlling unit for allocating a communications bandwidth in response to a request issued from a subscriber using a CBR service such as a VOD service, a speech service, etc. This controlling unit includes a capability for performing an overbooking bandwidth control according to a time or a use rate, and a capability for communicating bandwidth information of a CBR connection between adjacent nodes.

Figure 1:
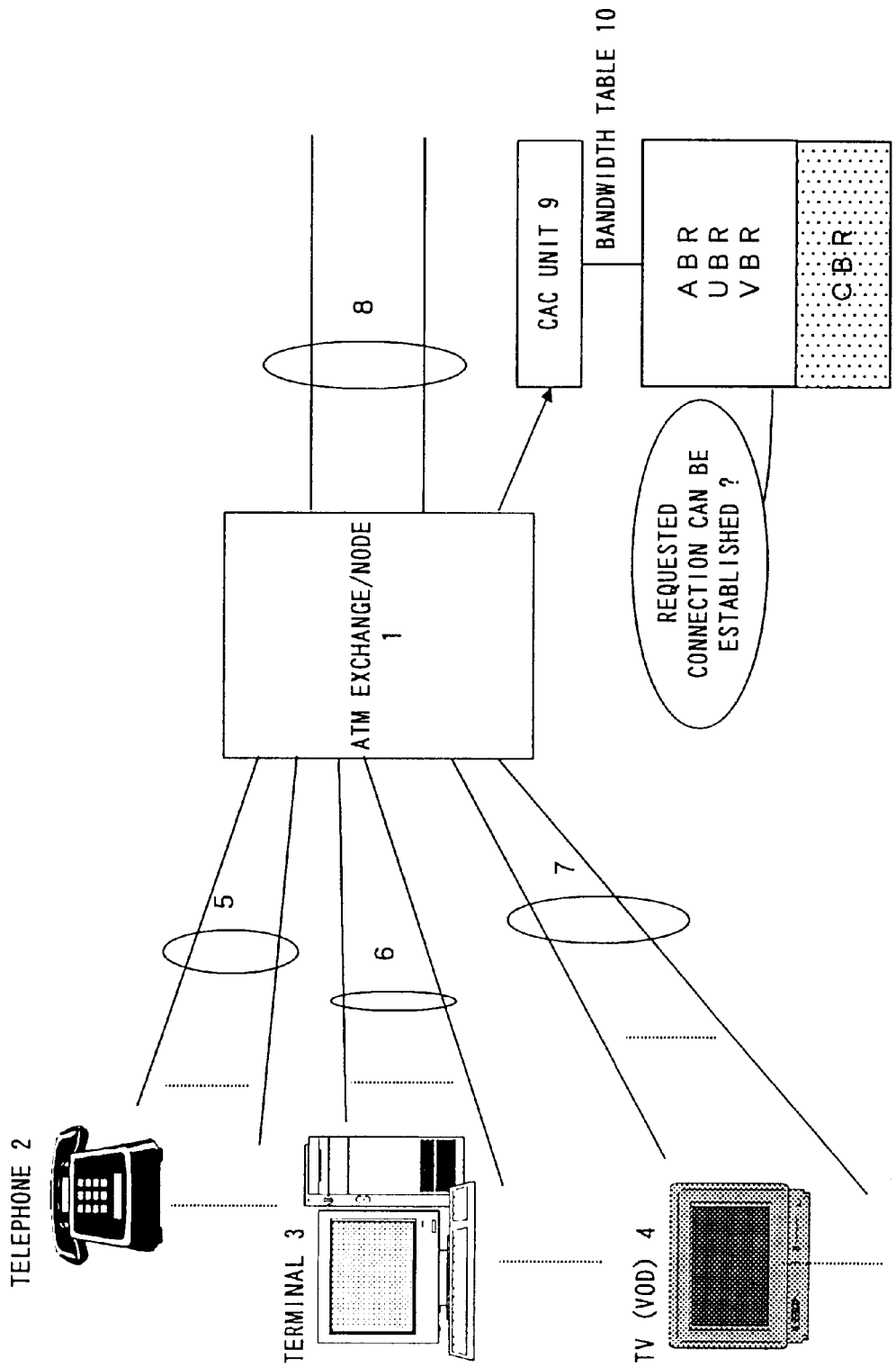
FIG. 1 shows the configuration of a conventional technique.
Figure 2:
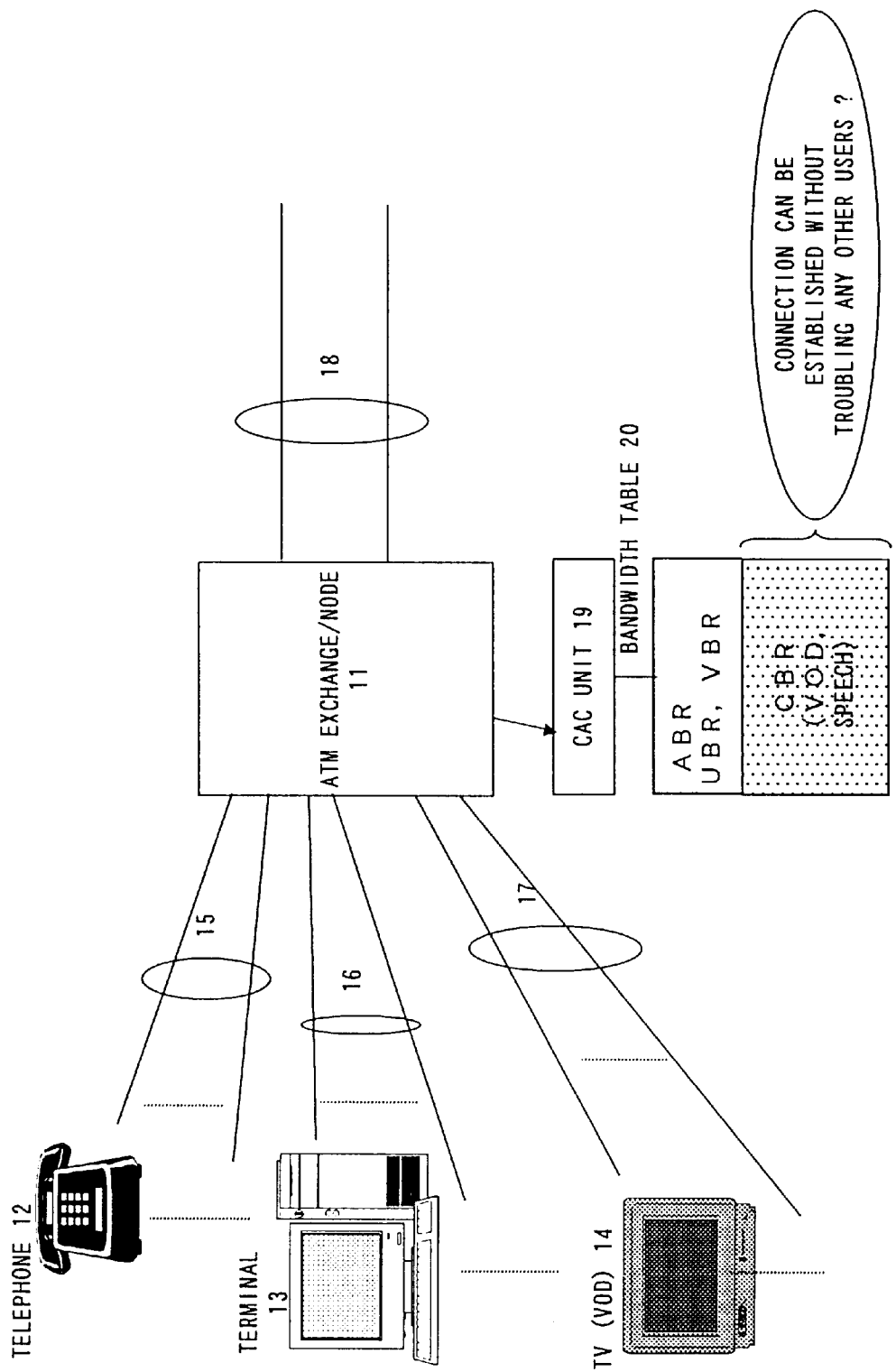
FIG. 2 shows the basic configuration of a preferred embodiment according to the present invention.

FIG. 2 shows the basic configuration of the preferred embodiment according to the present invention.

A CAC unit 19 within a node 11 being an ATM exchange determines whether or not to establish an originated request call received from one of subscriber terminals 12 through 14 via one of subscriber lines 15 through 17 based on a bandwidth table 20 in which the information about a bandwidth recognized for each service is set.

In this case, the CAC unit 19 performs a control (hereinafter referred to as an overbooking bandwidth control) for allocating a broader bandwidth than that of a CBR connection (CBR bandwidth), which is set in the bandwidth table 20, in correspondence with the physical bandwidth within the ATM exchange for the subscriber terminal 14 utilizing the CBR service such as a VOD service, a speech service, etc. with a low probability that there is a steady rate of communication.

In addition, the CAC unit 19 controls the subscribers 12 and 13, who utilize different services, by allocating bandwidths different from that of the CBR connection. Therefore, the subscriber 14 utilizing the CBR service is less likely to trouble the other subscribers 12 and 13.

With the above described control, another subscriber using a CBR service can be overbooked without troubling other subscribers including a subscriber using a CBR service.

Figure 3:
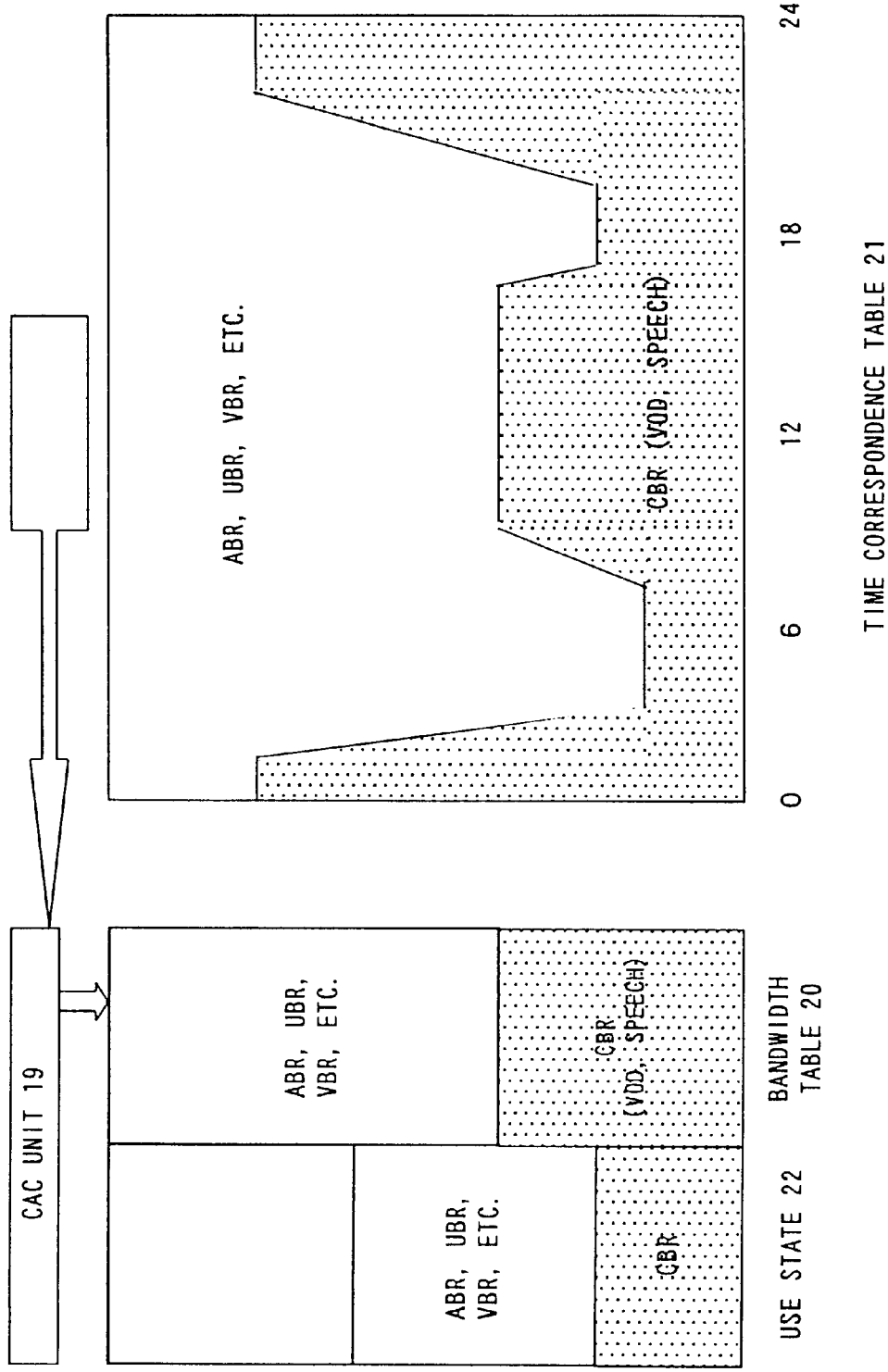
FIG. 3 explains a control depending on a time zone, which is performed by a CAC unit.

FIG. 3 explains the control depending on a time zone, which is performed by the CAC unit 19.

A network administrator generates a time correspondence table 21 in consideration of a use rate of each service, which changes with time. The CAC unit 19 can change the contents set in a bandwidth table 20 based on the generated time correspondence table 21.

Here, the connection which has already been established will never be forcibly released even if the contents set in the bandwidth table 20 are changed based on the contents set in the time correspondence table 21. The CAC unit 19 is intended to control whether or not to establish a corresponding connection based on the contents set in the bandwidth table 20 when a connection request call is originated from one of subscriber terminals 12 through 14, and is not to restrict a currently established connection.

Figure 4:
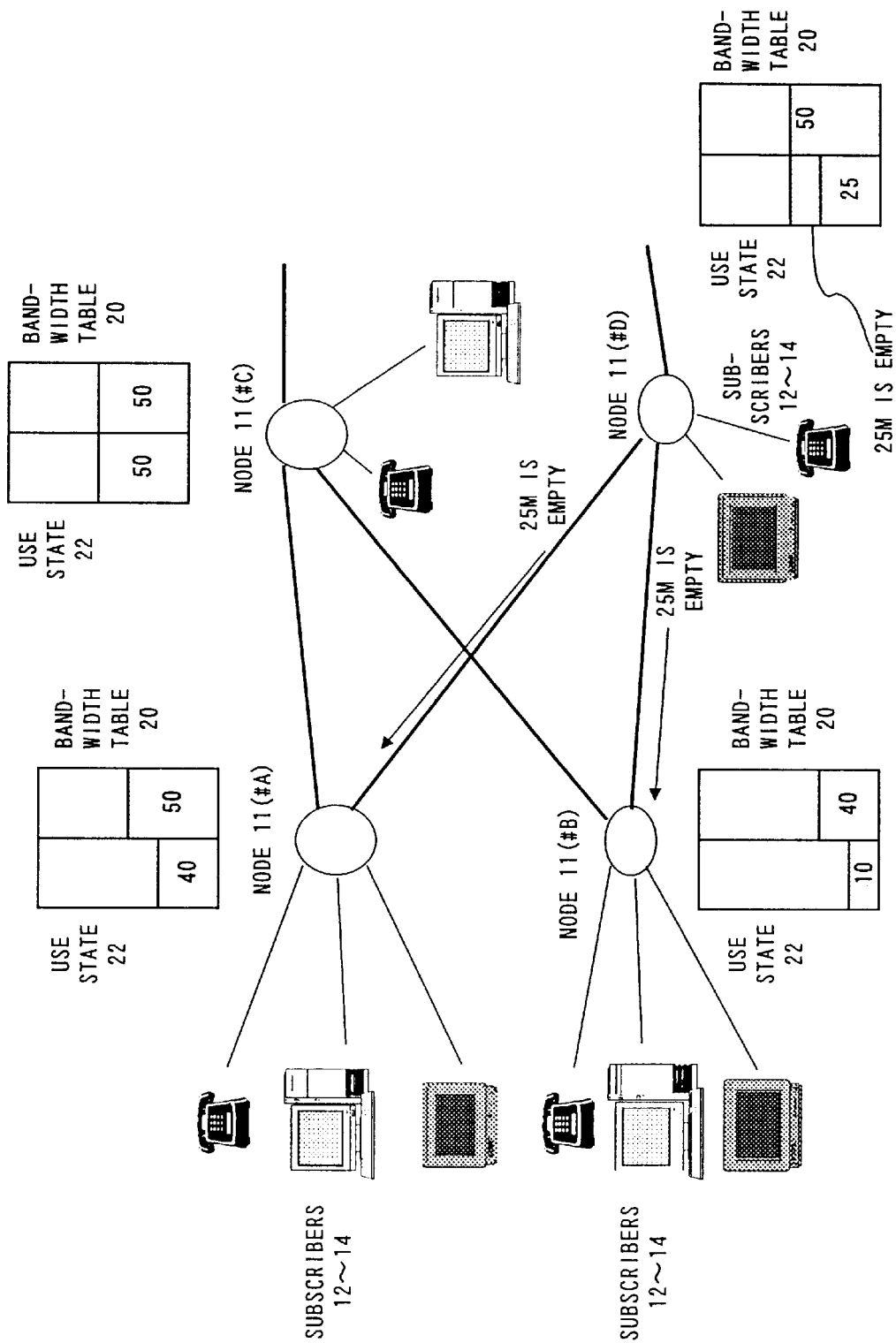
FIG. 4 explains the processes performed by adjacent nodes.

FIG. 4 explains the processes performed by adjacent nodes 11.

Use states 22 of each service on input (subscriber) and output (node) sides are notified between adjacent nodes 11.

For example, a node 11 (#C) does not notify adjacent nodes 11 #A, #B, etc., because the bandwidth (CBR bandwidth) registered to the bandwidth table 20 that the node 11 (#C) itself possesses is the same as the bandwidth used by the CBR service (CBR used bandwidth), which is registered as the use state 22, and there is no empty band. In the meantime, a node 11 (#D) notifies the respective nodes 11 #A and #B on the input (subscriber) side of the CBR bandwidth information, for example, by using resource management cells (RM cells), because the CBR bandwidth registered to the bandwidth table 20 that the node 11 (#D) itself possesses is broader than the CBR used bandwidth registered as the use state 22 by 25 Mbps.

At this time, if the bandwidth of a connection other than the CBR connection used by the node 11 (#A) has a spare band and if a request exceeding the bandwidth value set in the bandwidth table 20 that the node 11 (#A) possesses is issued from one of the subscriber terminals 12 through 14, the corresponding connection can be established in order not to trouble the other ATM exchanges such as the node 11 (#D), etc.

As described above, not only the overbooking bandwidth control within a local station itself, but also the use states of other nodes 11 are considered by obtaining the CBR bandwidth information of adjacent nodes 11. Since notification is made only to the adjacent nodes, management is easy and a control load is light. Consequently, the speed of a call control process can be improved.

Figure 5:
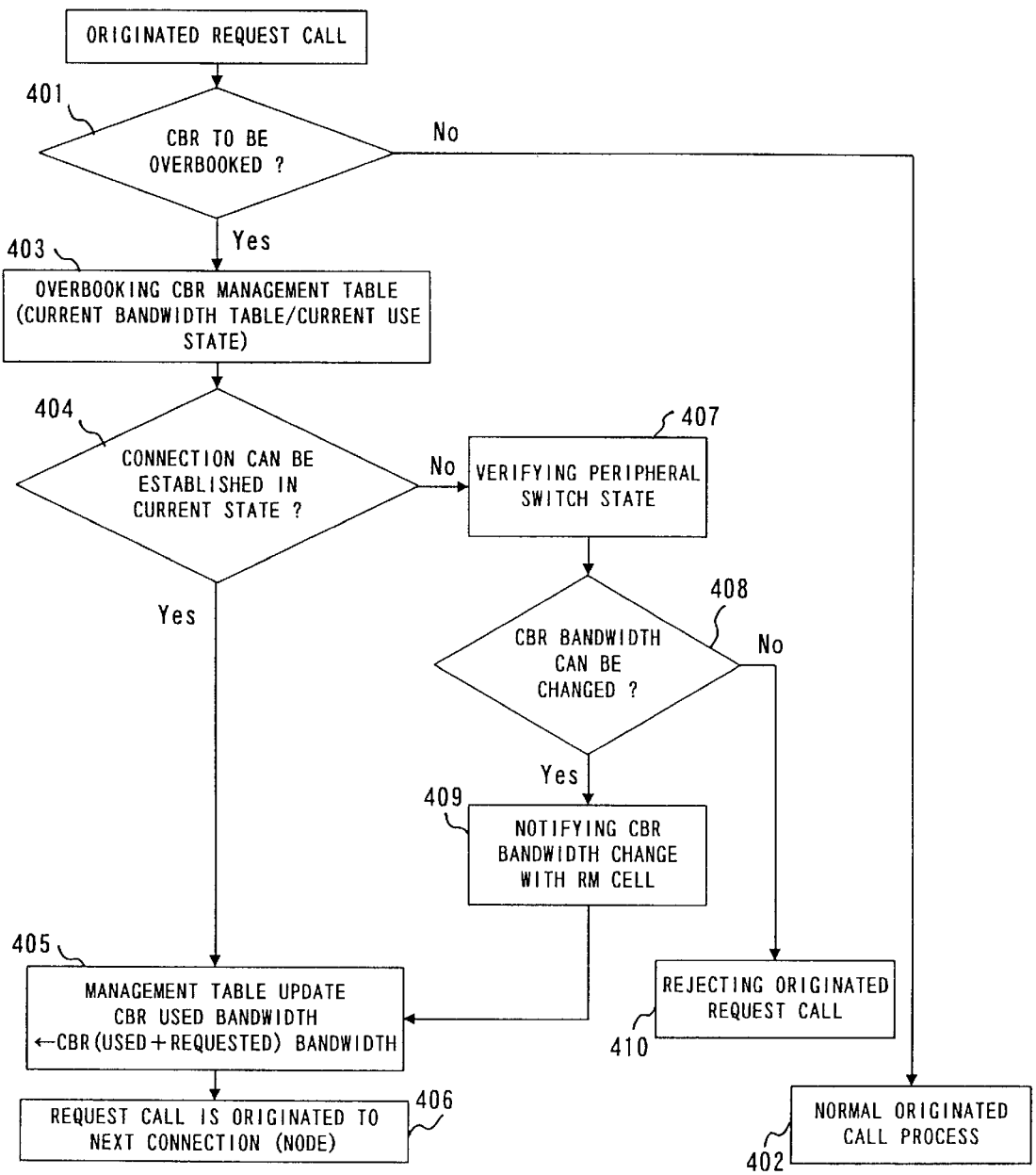
FIG. 5 is a flowchart showing the process for establishing a connection.

FIG. 5 is a flowchart showing the control process for establishing a connection, which is performed by the CAC unit 19 within the node 11 (ATM exchange) in response to the connection request call originated from a subscriber side.

The CAC unit 19 first determines whether or not the subscriber terminal which has originated the call requests a CBR service to be overbooked (hereinafter referred to as an overbooking CBR) (step 401).

If the overbooking CBR is not requested, that is, if the determination made in step 401 is "NO", the flow proceeds to a normal originated call process (step 402). In this way, the performance of the originated call process can be prevented from being degraded due to the addition of the overbooking bandwidth control for the CBR service.

If the above described CBR service is requested, that is, if the result of the determination made in step 401 is "YES", the CAC unit 19 determines whether or not to be able to establish the connection corresponding to the originated request call origination, by referencing the bandwidth table 20 and the use state 22, which are the management tables for an overbooking CBR (steps 403 and 404).

If the connection can be established, that is, if the result of the determination made in step 404 is "YES", the CAC unit 19 registers as a new CBR used bandwidth the bandwidth obtained by adding the bandwidth requested by the originated call to the current CBR used bandwidth registered to the management table of the use state 22 (step 405).

Then, the CAC unit 19 originates a connection request call to an adjacent node 11 (step 406). As a result, the originated call control process similar to that described above is performed by the CAC unit 19 within the adjacent node 11.

On the contrary, if the connection requested by the above described call cannot be established, that is, if the result of the determination made in step 404 is "NO", the CAC unit 19 determines whether or not to be able to change (broaden) the CBR bandwidth registered to the bandwidth table 20 (step 408) by verifying the state of a peripheral switch (step 407).

If the CBR bandwidth can be changed, that is, if the result of the determination made in step 408 is "YES", the CAC unit 19 first notifies the adjacent node 11 with an RM cell or a signaling message that the CBR bandwidth within the bandwidth table 20 is changed (step 409).

Then, the CAC unit 19 registers as a new CBR used bandwidth the bandwidth obtained by adding the bandwidth requested by the originated call to the current CBR used bandwidth registered to the management table of the use state 22 (step 405).

The CAC unit 19 originates a connection request call to an adjacent node 11 (step 406). As a result, the CAC unit 19 within the adjacent node 11 performs the originated call control process similar to that described above.

On the contrary, if the CBR bandwidth cannot be changed, that is, if the result of the determination made in step 408 is "No", the connection request call is rejected (step 410).

Figure 6:
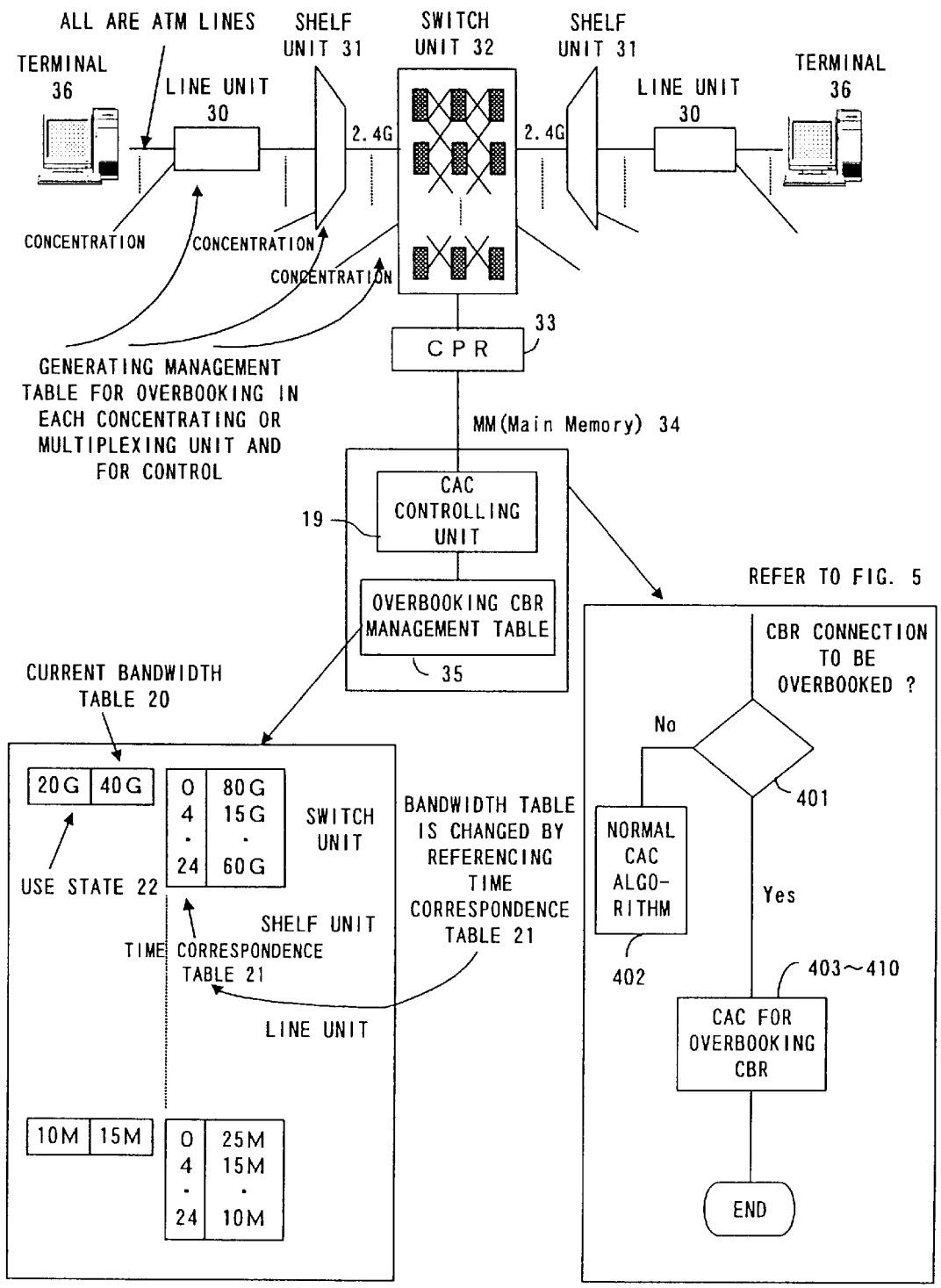
FIG. 6 shows the configuration of an ATM exchange according to the preferred embodiment of the present invention.

FIG. 6 shows a more specific configuration of an ATM exchange being a node 11, according to this preferred embodiment.

In this configuration, the ATM exchange includes a line unit 30 for terminating a terminal 36 connected by an ATM line, a shelf unit 31 for concentrating the output of each line unit 30, and a switch unit 32 for switching the output (for example, at a 2.4-Gbps transmission rate) of each shelf unit 31.

Additionally, the CAC unit 19 that performs the control operations represented by the flowchart shown in FIG. 5 is implemented as a program within an MM (Main Memory) 34, which is executed by a CPR (Call PRocessor) 33.

Additionally, an overbooking CBR management table 35 is arranged in the MM 34 in this configuration. This management table is configured so that the above described time correspondence table 21 (refer to FIG. 3), the bandwidth table 20 (refer to FIG. 4), and the use state 22 (refer to FIG. 4) are arranged in correspondence with the respective capability units such as each line unit 30, each shelf unit 31, and the switch unit 32.

In the respective capability units where the overbooking bandwidth control is performed, the CBR used bandwidth on the subscriber side (line side), which is set as the use state 22, is set to be broader than the physical bandwidth (the CBR bandwidth registered to the bandwidth table 20) of the CBR connection, which is secured on the output side.

The CAC unit 19 performs the overbooking bandwidth control represented by the flowchart shown in FIG. 5 for each of the capability units. In this way, a traffic control with more flexibility and a higher accuracy can be performed for the CBR connection.

Figure 7:
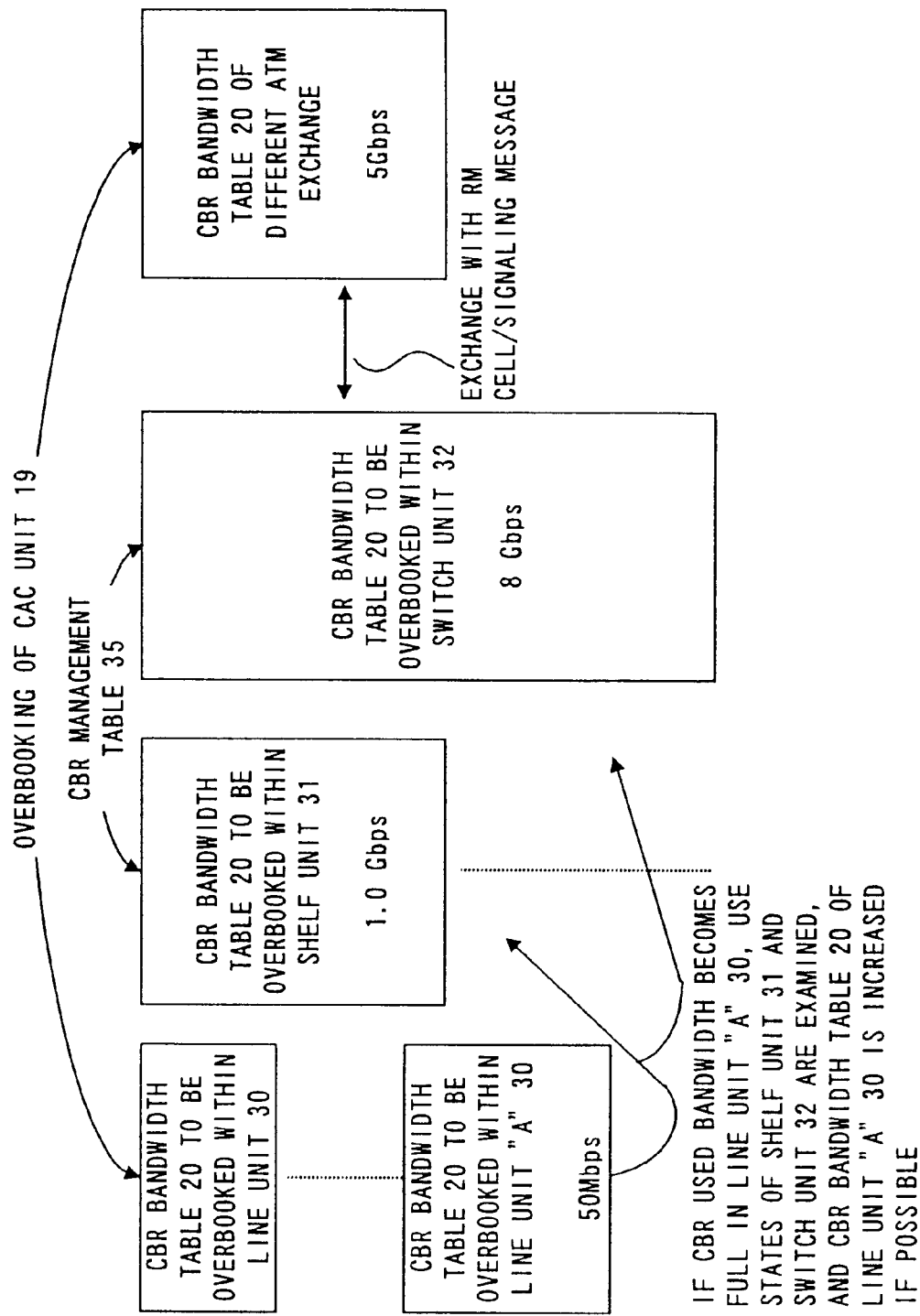
FIG. 7 explains the process for changing a CBR bandwidth.

In the configuration shown in FIG. 7, the overbooking CBR management table 35 can be configured so that the time correspondence table 21, the bandwidth table 20, and the use state 22, which correspond only to each line unit 30 and to each shelf unit 31, are arranged, and at the same time, the switch unit 32 can be configured so that the CBR bandwidth control operations for performing not an overbooking control but a normal control are executed. In this case, a processing load can be reduced by a workload corresponding to an overbooking bandwidth control performed by the switch unit 32, although the flexibility becomes less than that in the above described case.

To further reduce the processing load, the time correspondence table 21, the bandwidth table 20, and the use state 22, which correspond only to each line unit 30, can be arranged in the overbooking CBR management table 35, and a CBR bandwidth control similar to a normal control can be performed in each shelf unit 31 and the switch unit 32.

Figure 8:
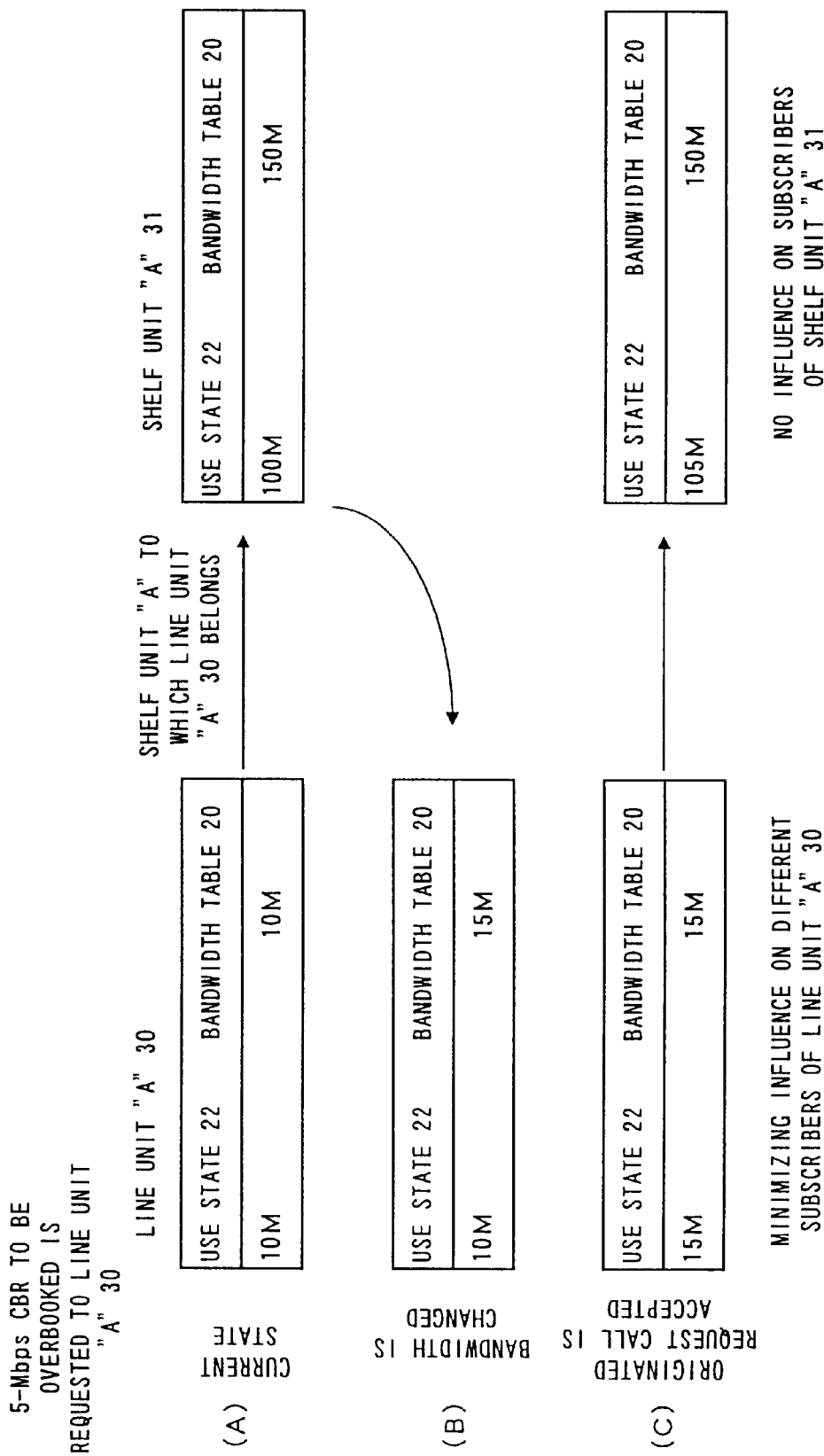
FIG. 8 explains the process for accepting an originated request call based on a change of the CBR bandwidth.

FIGS. 7 and 8 explain an embodiment of the control process corresponding to step 407 shown in FIG. 5.

If the CBR used bandwidth registered as the use state 22 covers the CBR bandwidth registered to the bandwidth table 20 in one of the capability units (the line unit 30, the shelf unit 31, or the switch unit 32) on the condition that an overbooking CBR connection request call is originated, the CAC unit 19 examines the state of a peripheral switch (the shelf unit 31, the switch unit 32, or another ATM exchange), which relates to the capability unit, and can change the CBR bandwidth registered to the bandwidth table 20 of each of the capability units based on the examined state.

Assume that a 50-Mbps CBR bandwidth is set in the bandwidth table 20 corresponding to one line unit 30 (line unit "A" 30), a 1.0-Gbps CBR bandwidth is set in the bandwidth table 20 corresponding to one shelf unit 31, a 8-Gbps CBR bandwidth is set in the bandwidth table 20 corresponding to the switch unit 32, and an adjacent ATM exchange notifies that a 5-Gbps CBR bandwidth can be broaden, as shown in FIG. 7. If the CBR used bandwidth within the use state 22 corresponding to the line unit "A" 30 becomes full in this case, the CBR bandwidth registered to the bandwidth table 20 corresponding to the line unit "A" 30 can be broaden if possible, as a result of verifying the use states 22 of the shelf unit 31 and the switch unit 32.

More specifically, for example, if a call for requesting a 5-Mbps CBR connection to be overbooked is originated on the condition that the CBR used bandwidth within the use state 22 corresponding to the line unit "A" 30 is the same as the 10-Mbps CBR bandwidth within the bandwidth table 20 corresponding to the line unit "A" 30 as shown in FIG. 8A, the CAC unit 19 verifies the use state 22 corresponding to the shelf unit "A" 31 to which the line unit "A" 30 belongs.

If the CBR used bandwidth registered as the use state 22 corresponding to the shelf unit "A" 31 is, for example, 100 Mbps, which is narrower than 150 Mbps of the CBR bandwidth registered to the bandwidth table 20 corresponding to the shelf unit "A" 31, as shown in FIG. 8, the CAC unit 19 broadens the CBR bandwidth corresponding to the line unit "A" 30 from 10 Mbps to 15 Mbps as shown in FIG. 8B, and accepts the call for requesting a 5-Mbps CBR connection as shown in FIG. 8C.

In this case, the influence on connections of different subscriber terminals accommodated by the line unit "A" 30 is minimized, and similarly, there is no influence on different subscribers accommodated by the shelf unit "A" 31.

Figure 9:
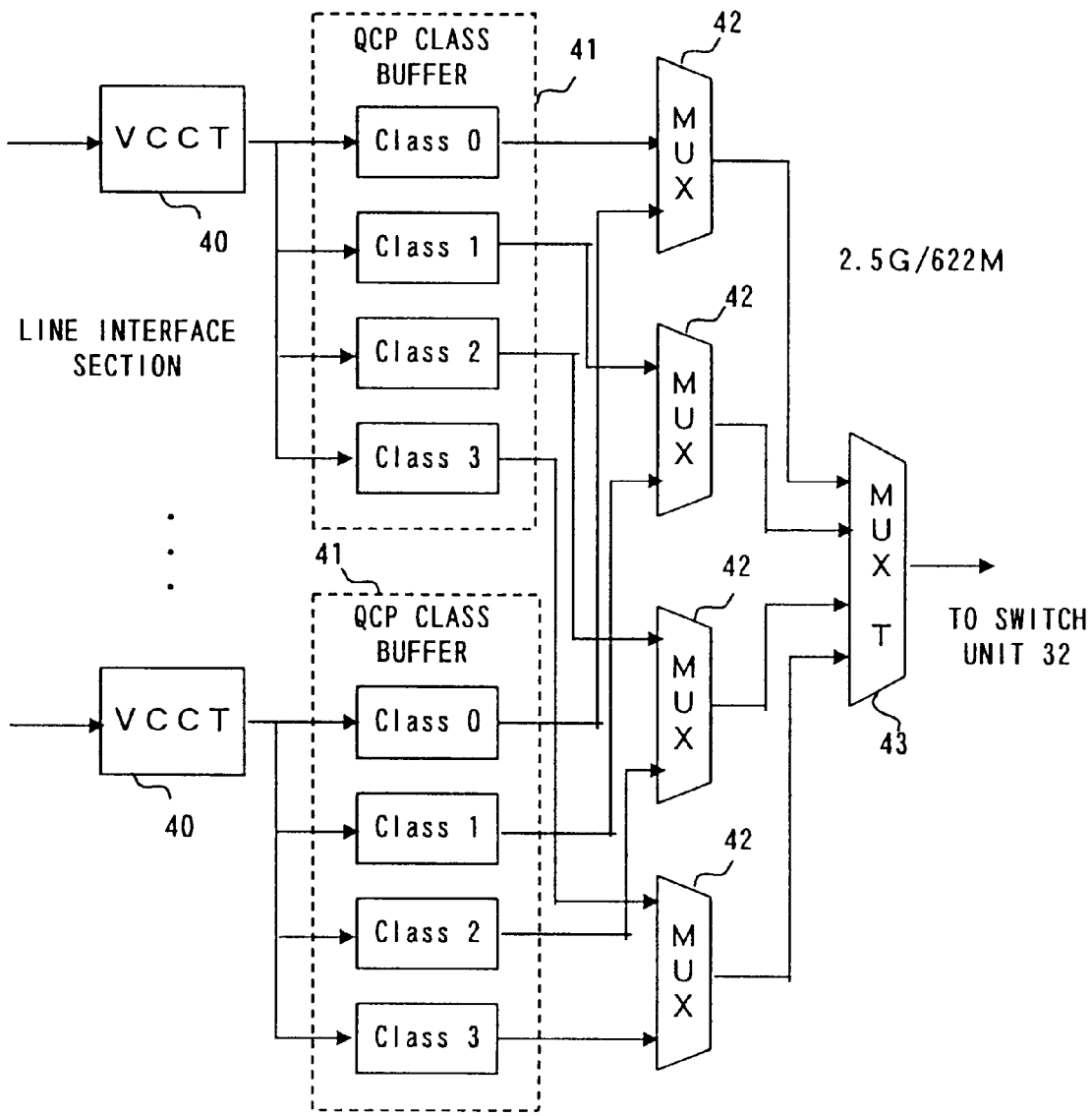
FIG. 9 exemplifies the configuration of a shelf unit.

FIG. 9 exemplifies the configuration of the shelf unit 31. This configuration includes a capability unit VCCT 40 for rewriting a VCI (Virtual Channel Identifier) and a VPI (Virtual Path Identifier), which are assigned to the header of each ATM cell, and a QCP (Quality Control Path) buffer unit 41 is arranged between a multiplexing unit MUX 42 and a MUX T 43.

Control data indicating the quality class of an ATM cell is added to the header of the ATM cell input to the VCCT 40. The VCCT 40 writes each ATM cell to the class buffer within the QCP buffer unit 41, which corresponds to the quality class to which each ATM cell belongs, based on the control data. The output from each class buffer to each MUX 42 is controlled based on a read rate, an allowed delay value, etc., which corresponds to each class.

Among the above described respective classes, for example, a class 0 (QCP 0) is controlled to be used by a CBR connection, and the other classes (QCPs 1 through 3) are controlled to be corresponded to the services (such as rt-VBR, nrt-VBR, ABR, and UBR) whose bandwidths change depending on the use state of a network.

Figure 10A:
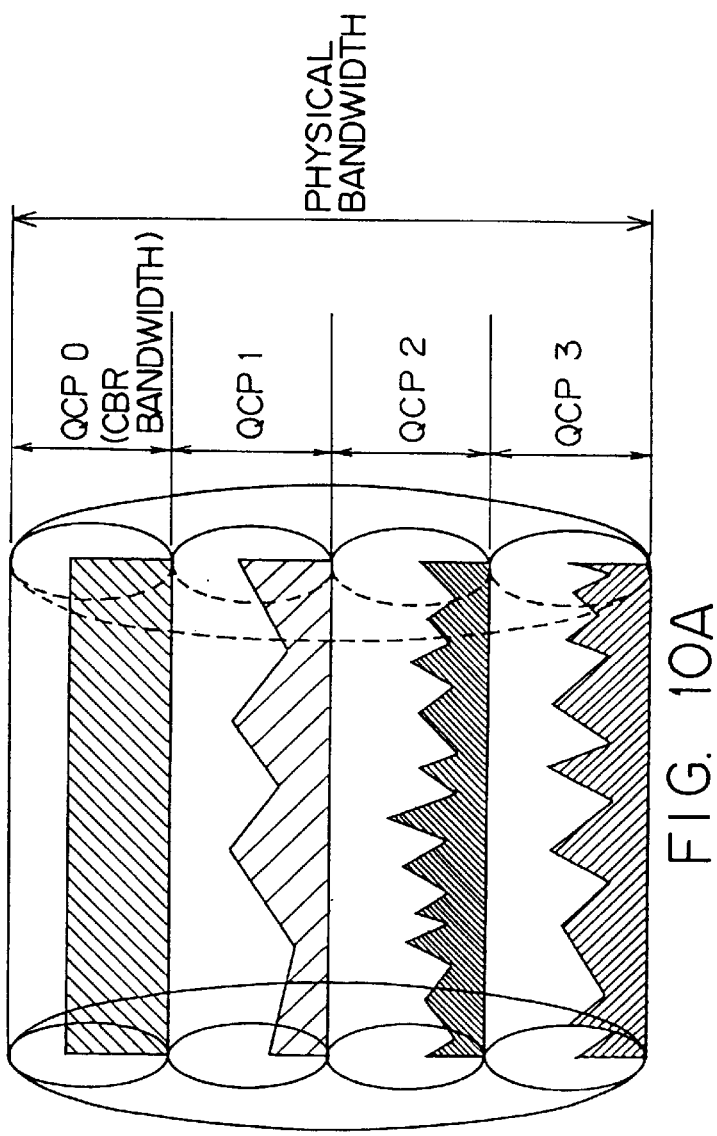
FIG. 10 explains a QCP control.

The bandwidth which is used by the CBR connection and corresponds to the QCP 0 is fixed as shown in FIG. 10A, while the bandwidths used by the connections for the other services, which correspond to the QCPs 1 through 3, change with time as shown in FIG. 10A.

In this case, according to this preferred embodiment, the CBR bandwidth registered to the bandwidth table 20 can be flexibly changed based on the above described overbooking bandwidth control, and the read rate from the buffer of the class 0 (QCP0) within the QCP buffer unit 41 is changed according to the registered CBR bandwidth.

Figure 10B:
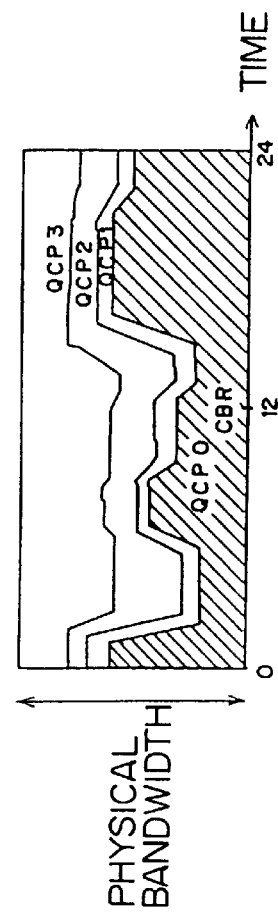

Additionally, according to this preferred embodiment, the time correspondence table 21 being a part of the overbooking CBR management table 35 shown in FIG. 6 is arranged as described above, and the CAC unit 19 can change the CBR bandwidth registered to the bandwidth table 20 according to a time based on the time correspondence table 21. As a result, the CBR bandwidth allocated to the CBR connection of the QCP 0 can be changed according to a time as shown in FIG. 10B, for example, in the buffer control process based on the QCP.

Figure 11:
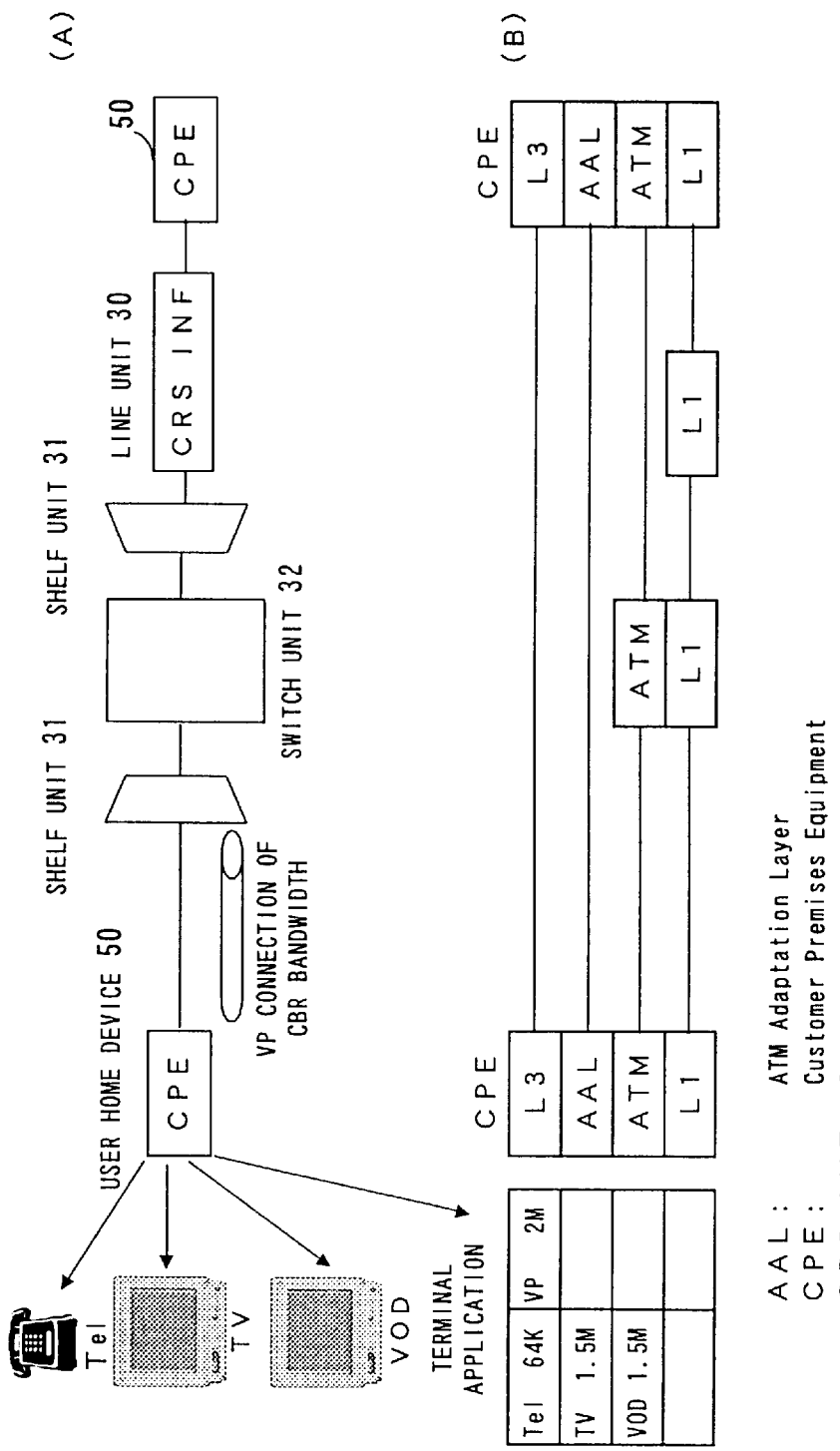
FIG. 11 explains a CBR bandwidth control performed on a user side.

FIG. 11 shows the configuration of the preferred embodiment which performs the CBR bandwidth control not only within an ATM exchange, but also within a user home device 50 (CPE: Customer Premises Equipment).

As shown in FIG. 11A, the VP (Virtual Path) connection having the CBR bandwidth allocated to a subscriber is established between the shelf unit 31 within an ATM exchange (refer to FIG. 6) and the CPE 50.

The CPE 50 controls and manages the use state of each terminal connected thereto by using management tables similar to the above described bandwidth table 20, the use state 22, and the time correspondence table 21. In this case, the ratio of the bandwidth allocated to the terminal using a CBR service to the bandwidths allocated to the terminals using other services can be changed, for example, depending on a time zone.

In the control configuration shown in FIG. 11A, an ATM exchange is involved in an L1 layer and an ATM layer, which are physical layers, in a hierarchical protocol stack layer shown in FIG. 11B, while not the ATM exchange but the CPE 50 is involved in an AAL (ATM Adaptation Layer) which results in a distinction between a CBR connection and a different connection and an L3 layer being an application layer.

In this way, a user can effectively use a limited bandwidth, and can reduce communications cost.

Figure 12:
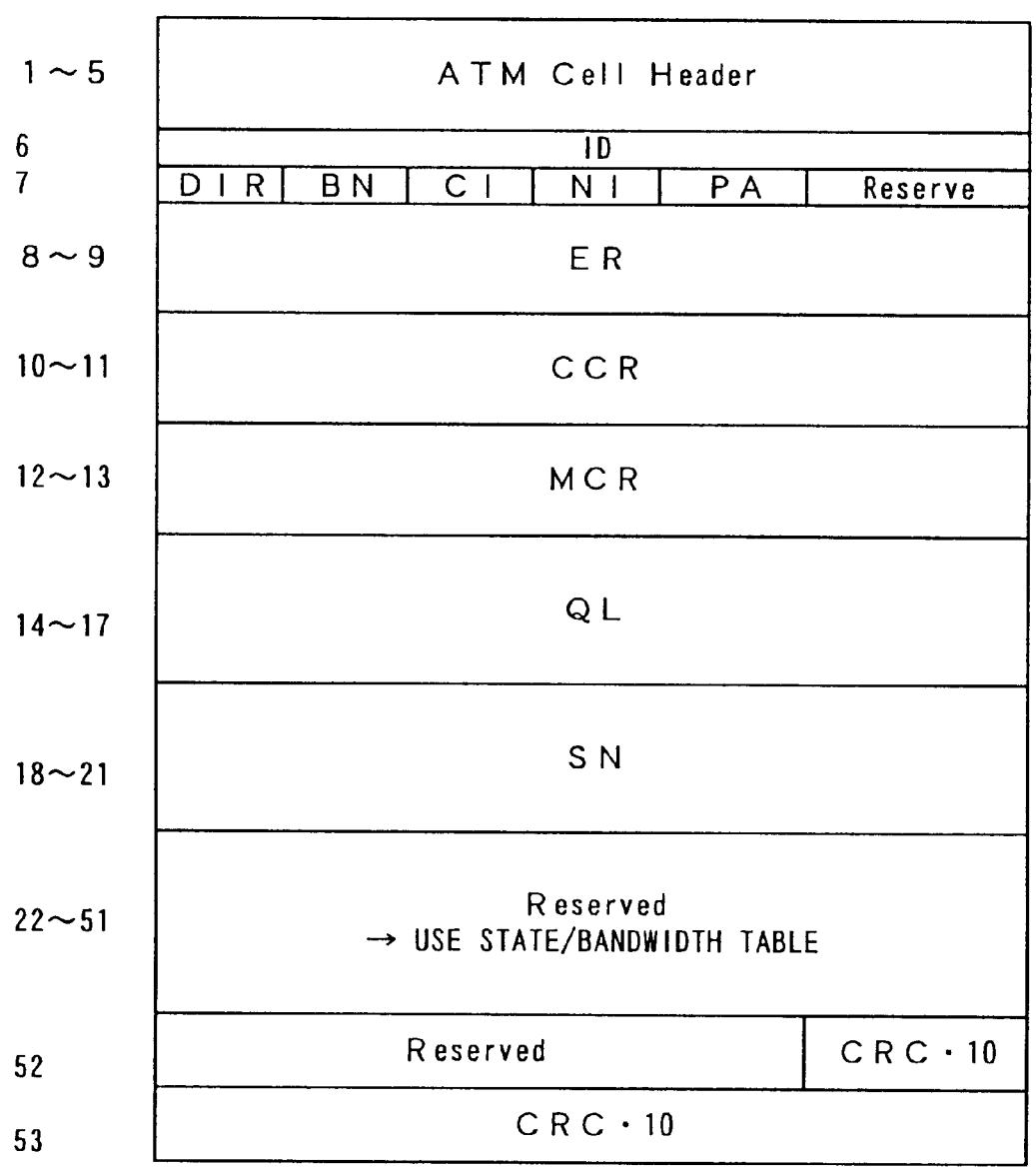
FIG. 12 shows the data structure of an RM cell which communicates CBR bandwidth information.

FIG. 12 shows the data structure of an RM cell for exchanging CBR bandwidth information between adjacent nodes 11.

In this configuration, an RM cell in which a reserved area includes each use state 22 and the bandwidth table 20, which are managed as the overbooking CBR management table 35 (shown in FIG. 6), is generated at one node 11, and is transmitted to an adjacent node 11.

FIG. 13 shows the data structure of CBR bandwidth information added to an arbitrary signaling message such as Setup, Notify, etc. when the CBR bandwidth information is exchanged by using not an RM cell but a signaling message between adjacent nodes 11.

In this configuration, the signaling message where each use state 22 and the bandwidth table 20, which are managed as the overbooking CBR management table 35 (shown in FIG. 6), is stored in an arbitrary empty area is generated at one node 11, and is transmitted to an adjacent node 11.

Figure 14:
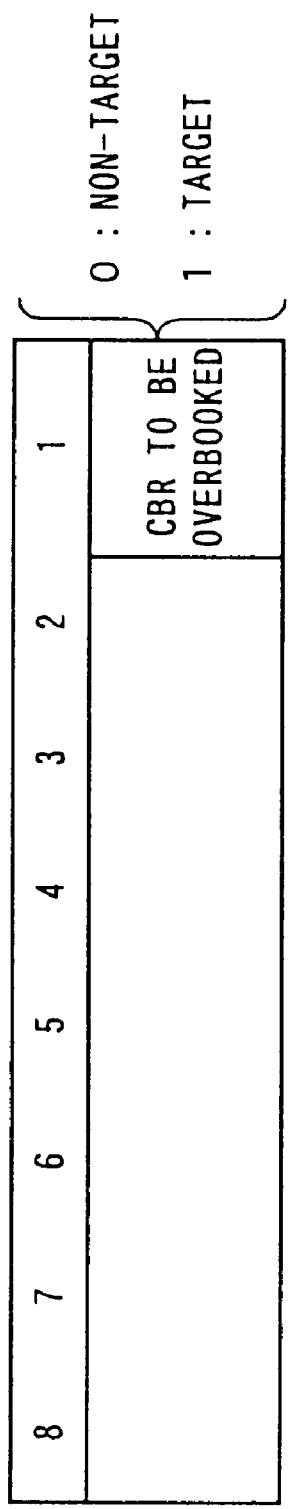
FIG. 14 shows the structure of CBR type information added to the signaling message.

FIG. 14 shows the structure of a signaling message to which 1-bit CBR type information indicating whether or not the CBR connection corresponding to the signaling message is an overbooking target is added.

With this CBR type information, a priority can be assigned to a CBR connection. For the CBR connection with high priority, the overbooking bandwidth control is not performed. By way of example, for the connection used for an entertainment service such as a VOD service, the overbooking bandwidth control is performed so as to allocate no more CBR bandwidth than is needed, while for the connection used for a video conference service, the overbooking bandwidth control is not performed so as to secure a dedicated bandwidth.

Figure 15:
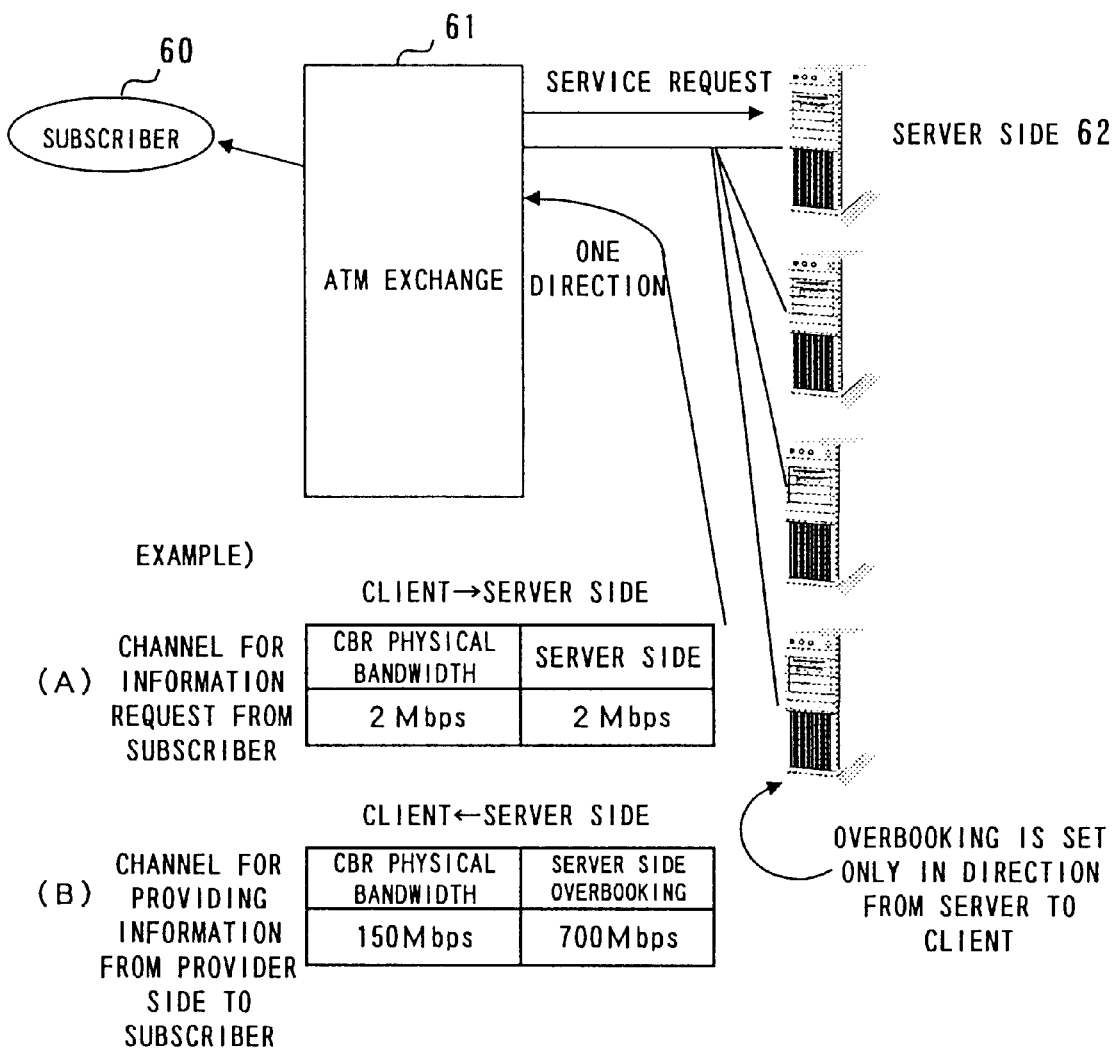
FIG. 15 explains an overbooking bandwidth control performed within a server-client system.

FIG. 15 explains the overbooking bandwidth control performed within a server-client system.

In a server-client service such as a VOD service, the bandwidth in one direction (from the server to the client) may sometimes be broader. Since the server side has various service types, the bandwidth corresponding to the respective services must be prepared.

Therefore, in FIG. 15, the CBR bandwidth in which the overbooking bandwidth control is not performed is allocated to the CBR connection in the direction from a subscriber 60 being a client side to a server side 62 via an ATM exchange 61, as shown in FIG. 11A.

For the CBR connection in the direction from the server side 62 to the subscriber 60 via the ATM exchange 61, the overbooking bandwidth control is performed and the CBR physical bandwidth (for example, of 700 Mbps), which is broader than the CBR physical bandwidth (for example, of 150 Mbps) is allocated as shown in FIG. 11B.

Consequently, it becomes possible to effectively use the CBR bandwidth on the server side 62.

In the above described configuration, the CBR bandwidth set in the bandwidth table 20 can be also changed depending on an increase/decrease in a requested number of CBR connections.

What is claimed is:

1. A cell switching device for switching a fixed-length cell, and for controlling a fixed rate connection, comprising:
    fixed rate bandwidth setting means for setting fixed rate bandwidth information being information about a bandwidth that the fixed rate connection can occupy;
    use state setting means for setting fixed rate used bandwidth information being information about a bandwidth that the fixed rate connection currently uses; and
    call controlling means for controlling whether or not to permit establishment of the fixed rate connection while performing an overbooking bandwidth control which permits a bandwidth indicated by the fixed rate used bandwidth information to exceed a bandwidth indicated by the fixed rate bandwidth information, based on the fixed rate bandwidth information set in said fixed rate bandwidth setting means and the fixed rate used bandwidth information set in said use state setting means, when the fixed rate connection is established, and for updating the fixed rate used bandwidth information set in said use state setting means, wherein:
    said fixed rate bandwidth setting means and said use state setting means are arranged for a corresponding capability part for switching or concentration-multiplexing the cell within the cell switching device; and said call controlling means performs the overbooking bandwidth control for the corresponding capability part while referencing said fixed rate bandwidth setting means and said use state setting means, which are arranged for the corresponding capability part.

2. The cell switching device according to claim 1, wherein:

the corresponding capability part is a line device for terminating a line, a shelf device for concentrating the line device, and a switch device for switching a cell input/output to/from the shelf device;

said fixed rate bandwidth setting means and said use state setting means are arranged for each of the line device, the shelf device, and the switch device; and said call controlling means performs the overbooking bandwidth control for each of the line device, the shelf device, and the switch device while referencing said fixed rate bandwidth setting means and said use state setting means, which are arranged for the line device, the shelf device, and the switch device.

3. The cell switching device according to claim 1, wherein:

the corresponding capability part is a line device for terminating a line, a shelf device for concentrating the line device, and a switch device for switching a cell input/output to/from the shelf device;

said fixed rate bandwidth setting means and said use state setting means are arranged for each of the line device and the shelf device; and said call controlling means determines whether or not to be able to perform the overbooking bandwidth control for each of the line device and the shelf device, while referencing said fixed rate bandwidth setting means and said use state setting means, which are arranged for the line device and the shelf device.

4. The cell switching device according to claim 1, wherein:

the corresponding capability part is a line device for terminating a line, a shelf device for concentrating the line device, and a switch device for switching a cell input/output to/from the shelf device;

said fixed rate bandwidth setting means and said use state setting means are arranged for a corresponding line device; and said call controlling means performs the overbooking bandwidth control for the corresponding line device while referencing said fixed rate bandwidth setting means and said use state setting means, which are arranged for the line device.

5. The cell switching device according to claim 1, wherein:

said call controlling means attempts to broaden the bandwidth that the fixed rate connection can occupy if the bandwidth that the fixed rate connection currently uses covers the bandwidth that the fixed rate connection can occupy, changes the fixed rate bandwidth information set in said fixed rate bandwidth setting means according to the broadened bandwidth, and controls whether or not to permit establishment of the fixed rate connection, when performing the overbooking bandwidth control.

6. The cell switching device according to claim 5, wherein:

said call controlling means attempts to broaden the bandwidth that the fixed rate connection can occupy based on bandwidth information of the fixed rate connection, which is notified from an adjacent cell switching device, if the bandwidth that the fixed rate connection currently uses covers the bandwidth that the fixed rate connection can occupy, and notifies the adjacent cell switching device of new bandwidth information of the fixed rate connection according to a control result of the broadened bandwidth, when performing the overbooking bandwidth control.

7. The cell switching device according to claim 6, wherein the bandwidth information of the fixed rate connection between the cell switching devices is exchanged by using a resource management cell stipulated by asynchronous transfer mode cell switching procedures.

8. The cell switching device according to claim 6, wherein:

the bandwidth information of the fixed rate connection between the cell switching devices is exchanged by using a signaling message exchanged between the cell switching devices.

9. The cell switching device according to claim 1, wherein the fixed rate bandwidth information set in said fixed rate bandwidth setting means is varied depending on an increase/decrease in a requested number of fixed rate connections.

10. The cell switching device according to claim 1, wherein said call controlling means performs the overbooking bandwidth control only for a connection in the direction from a server service side to a client side when a fixed rate connection of a server-client type is established.

11. A cell switching device for switching a fixed-length cell, and for controlling a fixed rate connection, comprising:

fixed rate bandwidth setting means for setting fixed rate bandwidth information being information about a bandwidth that the fixed rate connection can occupy;

use state setting means for setting fixed rate used bandwidth information being information about a bandwidth that the fixed rate connection currently uses; and call controlling means for controlling whether or not to permit establishment of the fixed rate connection while performing an overbooking bandwidth control which permits a bandwidth indicated by the fixed rate used bandwidth information to exceed a bandwidth indicated by the fixed rate bandwidth information, based on the fixed rate bandwidth information set in said fixed rate bandwidth setting means and the fixed rate used bandwidth information set in said use state setting means, when the fixed rate connection is established, and for updating the fixed rate used bandwidth information set in said use state setting means, wherein:

said fixed rate bandwidth setting means and said use state setting means are arranged for a corresponding capability part for switching or concentration-multiplexing the cell within the cell switching device;

said call controlling means performs the overbooking bandwidth control for the corresponding capability part while referencing said fixed rate bandwidth setting means and said use state setting means, which are arranged for the corresponding capability part; and the fixed rate bandwidth information set in said fixed rate bandwidth setting means is varied according to a change information of a use rate of the fixed rate connection, which depends on a time zone.

12. A cell switching device for switching a fixed-length cell, and for controlling a fixed rate connection, comprising:

fixed rate bandwidth setting means for setting fixed rate bandwidth information being information about a bandwidth that the fixed rate connection can occupy;

use state setting means for setting fixed rate used bandwidth information being information about a bandwidth that the fixed rate connection currently uses; and call controlling means for controlling whether or not to permit establishment of the fixed rate connection while performing an overbooking bandwidth control which permits a bandwidth indicated by the fixed rate used bandwidth information to exceed a bandwidth indicated by the fixed rate bandwidth information, based on the fixed rate bandwidth information set in said fixed rate bandwidth setting means and the fixed rate used bandwidth information set in said use state setting means, when the fixed rate connection is established, and for updating the fixed rate used bandwidth information set in said use state setting means, wherein:

said fixed rate bandwidth setting means and said use state setting means are arranged for a corresponding capability part for switching or concentration-multiplexing the cell within the cell switching device;

said call controlling means performs the overbooking bandwidth control for the corresponding capability part while referencing said fixed rate bandwidth setting means and said use state setting means, which are arranged for the corresponding capability part; and said call controlling means attempts to broaden the bandwidth that the fixed rate connection can occupy based on a bandwidth state of the fixed rate connection controlled in other capability part within the cell switching device, if the bandwidth that the fixed rate connection currently uses covers the bandwidth that the fixed rate connection can occupy, when performing the overbooking bandwidth control.

13. A cell switching device for switching a fixed-length cell, and for controlling a fixed rate connection, comprising:

fixed rate bandwidth setting means for setting fixed rate bandwidth information being information about a bandwidth that the fixed rate connection can occupy;

use state setting means for setting fixed rate used bandwidth information being information about a bandwidth that the fixed rate connection currently uses; and call controlling means for controlling whether or not to permit establishment of the fixed rate connection while performing an overbooking bandwidth control which permits a bandwidth indicated by the fixed rate used bandwidth information to exceed a bandwidth indicated by the fixed rate bandwidth information, based on the fixed rate bandwidth information set in said fixed rate bandwidth setting means and the fixed rate used bandwidth information set in said use state setting means, when the fixed rate connection is established, and for updating the fixed rate used bandwidth information set in said use state setting means, wherein:

said fixed rate bandwidth setting means and said use state setting means are arranged for a corresponding capability part for switching or concentration-multiplexing the cell within the cell switching device;

said call controlling means performs the overbooking bandwidth control for the corresponding capability part while referencing said fixed rate bandwidth setting means and said use state setting means, which are arranged for the corresponding capability part; and each of cell switching devices for exchanging a signaling message about the fixed rate connection adds information for specifying whether or not the fixed rate connection undergoes the overbooking bandwidth control performed by said call controlling means, to the signaling message about the fixed rate connection, which is exchanged by each of the cell switching devices.

\* \* \* \* \*